US006776406B2

(12) United States Patent
Jaeger et al.

(10) Patent No.: US 6,776,406 B2
(45) Date of Patent: Aug. 17, 2004

(54) FEEDER AND SEPARATOR FOR SEPARATING AND MOVING SHEETS FROM A STACK OF SHEETS

(75) Inventors: Hans Jaeger, Thunstetten (CH); Stefan Etter, Kehrsatz (CH); Thomas Gasser, Bern (CH)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 58 days.

(21) Appl. No.: 10/081,318

(22) Filed: Feb. 21, 2002

(65) Prior Publication Data

US 2002/0140158 A1 Oct. 3, 2002

Related U.S. Application Data

(60) Provisional application No. 60/277,841, filed on Mar. 22, 2001, provisional application No. 60/277,873, filed on Mar. 22, 2001, provisional application No. 60/277,931, filed on Mar. 22, 2001, and provisional application No. 60/277,946, filed on Mar. 22, 2001.

(51) Int. Cl.[7] .............................. B65H 3/54; B65H 5/06; B65H 5/02
(52) U.S. Cl. ................... 271/121; 271/4.09; 271/10.03; 271/10.1
(58) Field of Search ................................ 271/124, 121, 271/4.09, 3.17, 10.03, 10.1

(56) References Cited

U.S. PATENT DOCUMENTS

| 987,097 A | * | 3/1911 | McArdle ................... 271/124 |
| 3,545,742 A | * | 12/1970 | Muller .................... 271/10.03 |
| 4,573,673 A | * | 3/1986 | Haug ........................ 271/111 |
| 5,664,771 A | * | 9/1997 | Nagatani et al. ......... 271/10.03 |
| 6,354,583 B1 | * | 3/2002 | Skadow et al. .......... 271/10.03 |
| 6,644,659 B2 | * | 11/2003 | Skadow et al. ........ 271/265.02 |
| 2002/0126148 A1 | * | 9/2002 | Rosenkranz et al. ........ 345/764 |
| 2002/0126310 A1 | * | 9/2002 | Hersberger et al. ........ 358/1.15 |
| 2002/0128986 A1 | * | 9/2002 | Stutz ........................... 705/401 |
| 2002/0133471 A1 | * | 9/2002 | Eskandari et al. .......... 705/401 |
| 2002/0140162 A1 | * | 10/2002 | Gasser et al. ............... 271/213 |
| 2002/0140164 A1 | * | 10/2002 | Frey et al. .................. 271/264 |
| 2002/0140766 A1 | * | 10/2002 | Niederhausern et al. ...... 347/33 |
| 2002/0143713 A1 | * | 10/2002 | Stutz ........................... 705/401 |
| 2002/0158401 A1 | * | 10/2002 | Staufer et al. ........... 271/10.01 |
| 2002/0165836 A1 | * | 11/2002 | Fluckiger et al. ........... 705/401 |
| 2002/0169728 A1 | * | 11/2002 | Moy et al. .................. 705/401 |
| 2002/0170681 A1 | * | 11/2002 | Saurer et al. ............. 156/441.5 |
| 2002/0178130 A1 | * | 11/2002 | Moy et al. .................. 705/406 |

FOREIGN PATENT DOCUMENTS

| JP | 56-3331 | * | 4/1981 | ................. 271/121 |
| JP | 56-37944 | * | 4/1981 | ................. 271/109 |
| JP | 57-4838 | * | 1/1982 | ............... 271/10.13 |
| JP | 61-206753 | * | 9/1986 | ................. 271/121 |
| JP | 62-264134 | * | 11/1987 | ................. 271/121 |
| JP | 63-196460 | * | 8/1988 | ................ 271/4.08 |
| JP | 64-87434 | * | 3/1989 | .............. 271/10.09 |

* cited by examiner

*Primary Examiner*—Donald P. Walsh
*Assistant Examiner*—Daniel K Schlak
(74) *Attorney, Agent, or Firm*—Perman & Green, LLP

(57) ABSTRACT

A feeder/separator apparatus for separating and moving sheets from a stack of sheets is described. The feeder/separator includes an input area for positioning the stack of sheets; a first and second series of rollers for jointly feeding a sheet on the bottom of the stack into an area of the apparatus including a third and forth series of rollers and a first series of belts; a pre-separation brake adapted to act in a pivoting pattern only on the first series of belts to cause a first stage separation of the bottom sheet; a separation brake adapted to act in a linear pattern only on the fourth series of rollers to cause a second stage separation of the bottom sheet, the pre-separation and separation brakes permitting the bottom sheets to be separated from the stack; and a fifth series of rollers and a second series of belts both being adapted to feed the bottom sheets away from the feeder/separator apparatus in a sheet feed path.

15 Claims, 6 Drawing Sheets

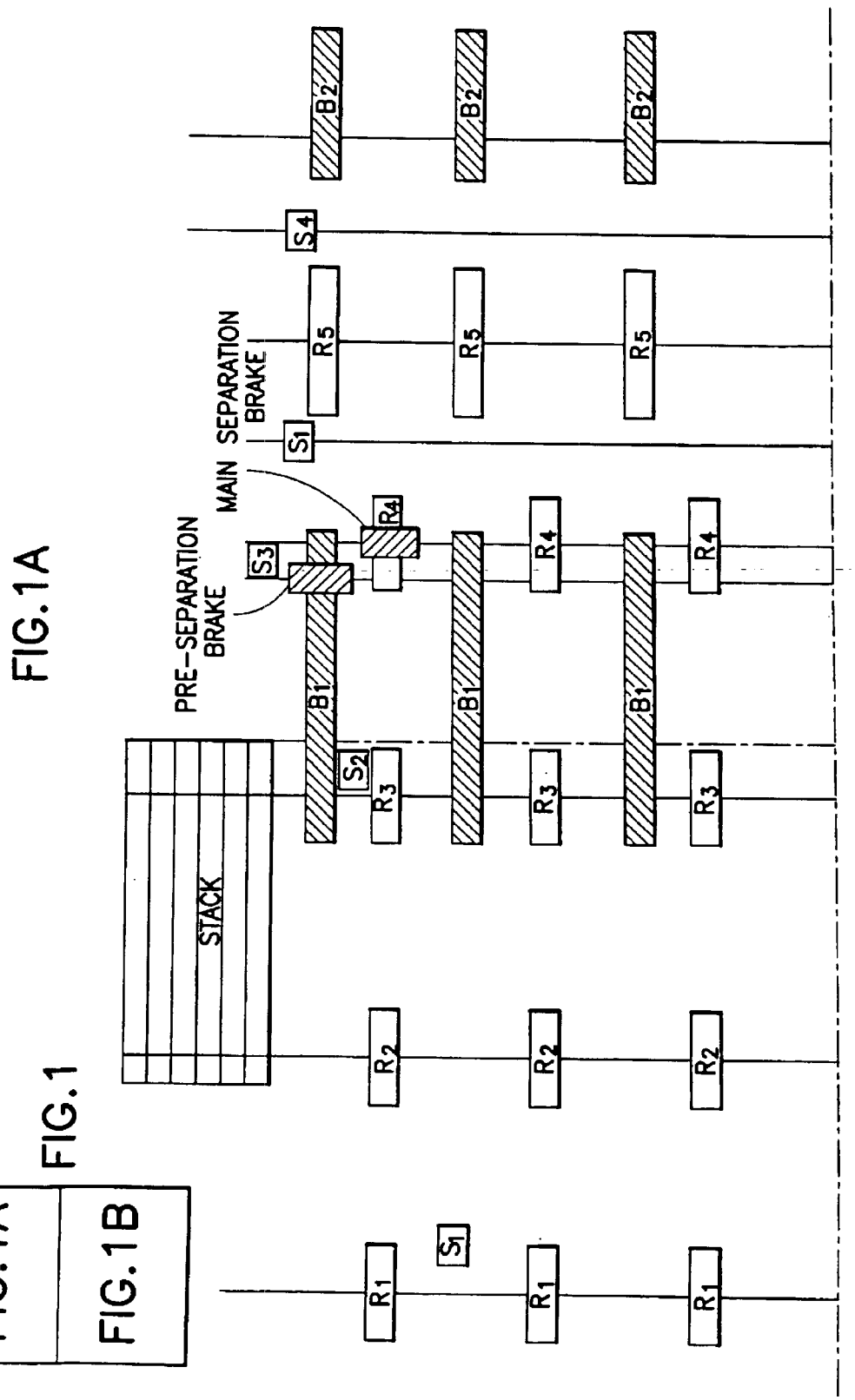

FEEDER AND SEPARATOR FOR SEPARATING AND MOVING SHEETS FROM A STACK OF SHEETS

CROSS-REFERENCES TO RELATED APPLICATIONS

This application claims priority of the following U.S. provisional patent applications:

Serial No. 60/277,841 filed on Mar. 22, 2001,
Serial No. 60/277,873, filed on Mar. 22, 2001,
Serial No. 60/277,931 filed on Mar. 22, 2001, and
Serial No. 60/277,946 filed on Mar. 22, 2001.

BACKGROUND OF THE INVENTION

1. Field of the Invention

This invention relates to a feeding and separating system for sheets of material from a stack of sheets such as, for example, a stack of mailpieces, i.e. envelopes, which are then to be fed into a postage meter for placing postage on the envelopes, and in particular to an improved feeder apparatus which accomplishes reliable and efficient separation for individual feeding of documents from a stack of documents even if the documents are of various thickness' and of various sizes.

2. Description of Prior Developments

The prior art describes many different types of feeding and separating devices. One issue that most of these devices have constantly raised is the fact that it is a particularly difficult part of the design of any stacked document feeder with regard to the separation of documents. It is extremely critical in these devices that documents be passed consistently one by one from the feeder to other equipment in the paper path, such as, for example, a postage meter. An example is where envelopes are fed from a postage meter positioned in a mailing machine. The passage of documents, e.g. envelopes, one by one permits the postage meter to place an imprint of postage on each of the envelopes in a reliable process. It is important that misfeeds such as duplicate feeding of two or more documents at the same time be minimized or completely eliminated. It is also desirable in such equipment that the feeder/separator apparatus be able to avoid the double feeding of envelopes completely while at the same time feed and separate mixed mail, i.e. feed and separate envelopes of varying sizes, thicknesses and dimensions. These various design goals need to be achieved within the constraints of cost and size factors. It is therefore particularly desirable to accomplish these various design goals within a reasonable cost of the product, while at the same time minimizing the number of parts and assembly steps needed to manufacture the feeder/separator in accordance with the features of the present invention.

SUMMARY OF THE INVENTION

It is therefore a primary objective of this invention to achieve the above-described advantages and design goals in a feeder/separator apparatus, and thereby describe a feeder/separator apparatus that (i) avoids the double feeding of envelopes; (ii) separates envelopes of different sizes; and (iii) automatically adjusts to the different thickness of the various envelopes being fed.

These various advantages and features of a feeder/separator is achieved in accordance with the features of the present invention by a feeder/separator apparatus for separating and moving sheets from a stack of sheets comprising: an input area for positioning the stack of sheets; a first and second series of rollers for jointly feeding a sheet on the bottom of the stack into an area of the apparatus including a third and forth series of rollers and a first series of belts; a pre-separation brake adapted to act in a pivoting pattern on the first series of belts only, to thereby cause a first stage separation of the bottom sheet; a separating brake adapted to act in a linear pattern on the forth series of rollers only, to thereby cause a second stage separation of the bottom sheet, the pre-separation and separation breaks permitting the bottom sheets to be separated from the stack; and a fifth series of rollers and a second series of belts both being adapted to feed the bottom sheets away from the feeder/separator apparatus in a sheet feed path.

BRIEF DESCRIPTION OF THE DRAWINGS

The foregoing aspects and other features of the present invention are explained in the following description, taken in connection with the accompanying drawings, wherein:

FIGS. 1A and 1B are partial top plan views illustrating a possible arrangement of rollers, belts and sensors for a feeder/separator in accordance with the present invention;

DESCRIPTION OF THE PREFERRED EMBODIMENTS

The feeder/separator apparatus in accordance with the features of the present invention can be used for feeding and separating any type of sheet-like material such as, for example, plastic material, paper, etc., which sheets are being fed through some sort of sheet conveying system or apparatus. For purposes of being able to explain the details of the present invention in the form of an example, this application shall primarily describe the features of the separator/feeder apparatus in accordance with the present invention in the form of a separator/feeder apparatus for separating and feeding mailpieces (e.g. envelopes) which are being fed within a mailing machine, e.g. envelopes being fed to a postage meter.

In accordance with the broadly described features of the present invention, a stack of mixed mail envelopes, i.e. mailpieces, are placed in a feeder unit which could be a feeder module for a use in a modular mailing machine that includes an envelope feeding function, an envelope separating function and an envelope moistening function. The envelopes are fed from the feeder unit to another portion of the mailing machine, e.g. a scale, one at a time at a very rapid rate. By "mixed mail" it is meant that the feeder/separator apparatus as described herein can be used with a stack of envelopes that can include for example, standard U.S. No. 10 envelopes which are approximately 105×241 mm; small envelopes which are approximately 89/127 mm (3½"×5"), and large envelopes which are approximately 254×356 mm (10"×14"). The thickness of the envelope can also vary from about a minimum thickness of about 0.5 mm to a maximum thickness of about 12.7 mm or ½"). The weight of the envelope can also vary from about a minimum of about 4 g to a maximum of about 500 g. Furthermore, when a feeding speed (or mailpiece processing speed) is described herein there is meant a low processing speed, i.e., about 8,000 letters per hour; a medium mailpiece processing speed, i.e. about 10,000 letters per hour; and a high mailpiece processing speed, i.e. about 13,000 mailpieces per hour.

The feeder as described herein has a separator portion that feeds envelopes off a stack of envelopes and into take away roller/belts where they are fed one at a time for the rest of their journey.

A stack sensor s2 is positioned adjacent the stack. It senses the presence of letters in stack. The feeder is shut down when ever the stack is empty.

A pre separation sensor s5 is positioned between the stack sensor and the pre separator brake. When ever the stack sensor detects letters and the pre separator sensor is free detects none the separator roller/belt assembly starts to bring a new letter. It stops when the pre separator sensor detects (the lead edge of) the new envelope transported to the separator and the next letter is not due for take away yet. The sensors are preferably optical type sensors but could be electrical or mechanical sensors.

Figure 1B:
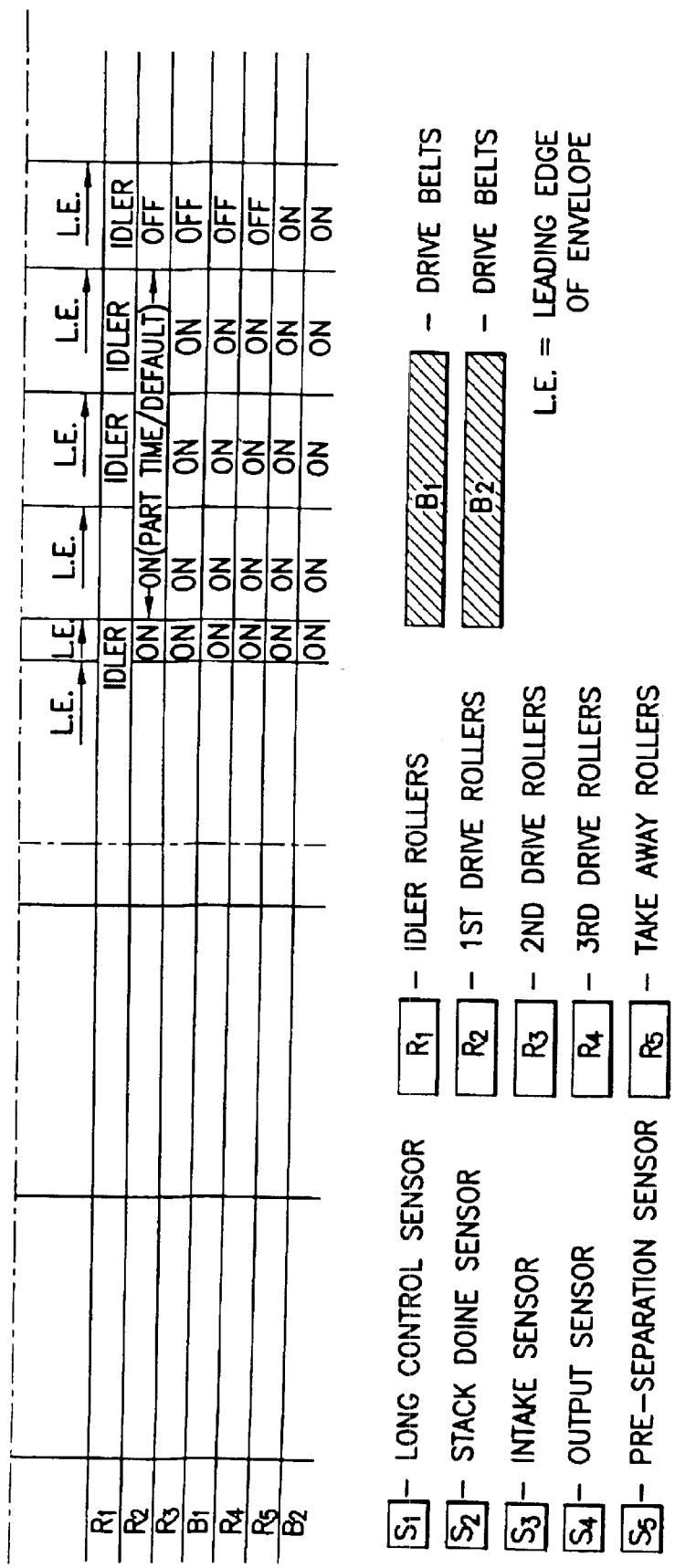
Figure 2:
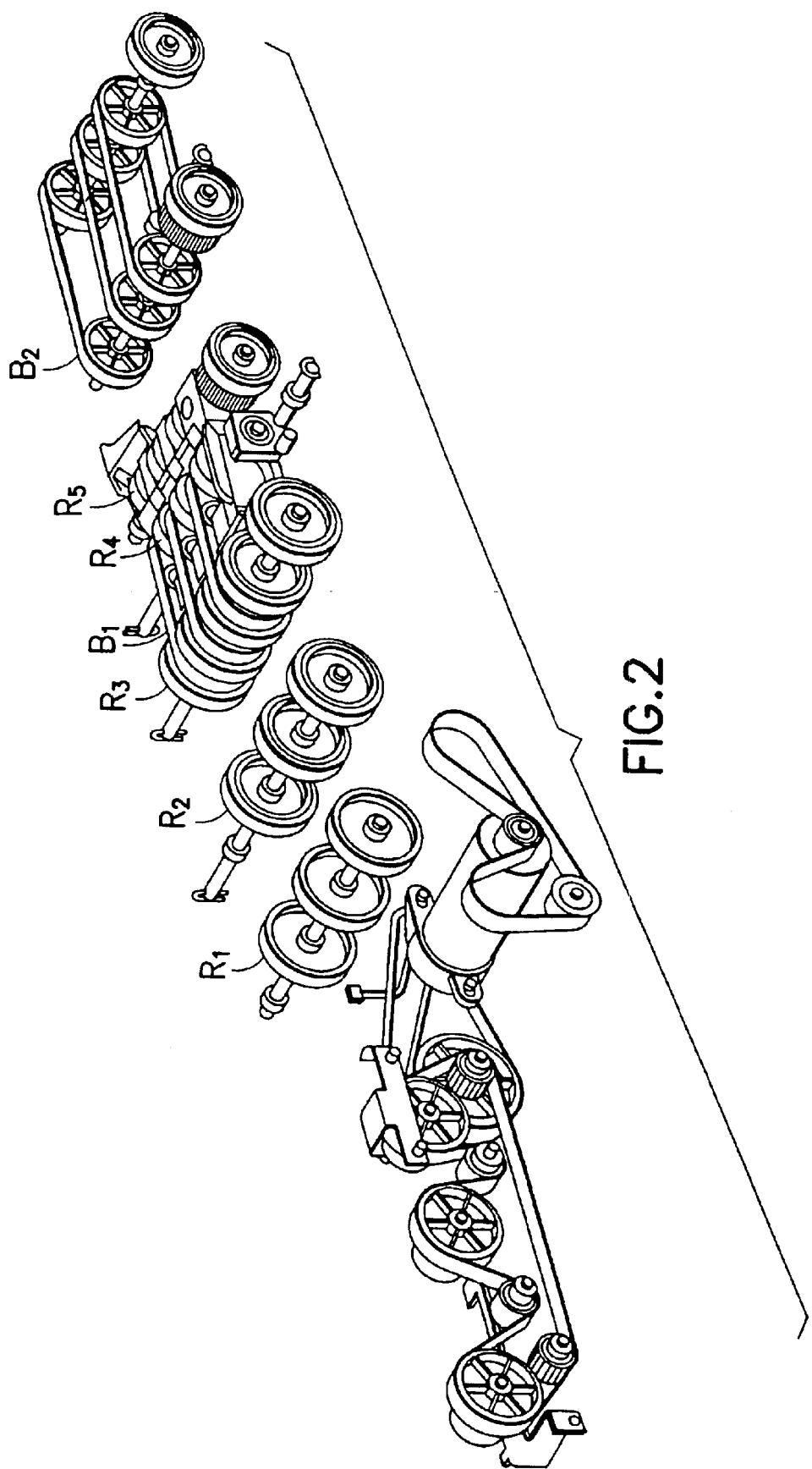
FIG. 2 is a first three dimensional view of an arrangement of rollers and belts for a feeder/separator in accordance with the present invention.

FIGS. 1A, 1B and 2 illustrate the various set of rollers and belts which form a major part of the feeder and separator apparatus in accordance with the features of the present invention in diagrammatic form. In the arrangement shown rollers R2 and R3/belt B1 feed a bottom envelope from a stack of envelopes into the area of the pre-separation brake. The pre-separation brake is a pivoted braking element and acts only on belt B1.

Figure 3:
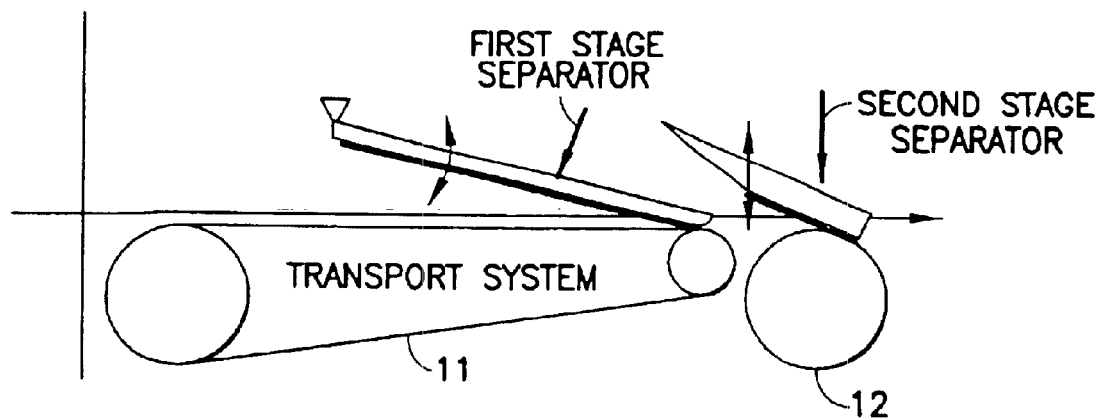
FIG. 3 is a front plan view of the pre-separation brake on a belt and a separation break on a roller, which function in accordance with the present invention.

The bottom envelope is then acted on by the main separation brake which acts on a roller (R4) only, and is positioned slightly downstream (about 6–7 mm) of the pre-separation brake. The main separation brake does not pivot like the pre-separation brake. Instead the main separation brake moves linearly. In accordance with the features of the present invention and as illustrated in FIG. 3, the complete separator mechanism consists of two functional stages, i.e. a first stage separator with a pivoting pre-separation brake which acts only on belt 11, and a second stage linearly moving main separation brake which acts only on roller 12. A specific example would be a first stage single flat polyurethane pivoting separator and a second stage flat polyurethane separator with linear motion but a second flat surface can be added in a material having a reduced friction rate (e.g. stainless steel).

FIGS. 1A and 1B specifically illustrates when the various rollers and belts are on and off relative to the leading edge position of an envelope being fed from a stack of envelopes, the locations of the various sensors, and the various brakes, and the approximate position of the stack of envelopes relative to the feed belts and rollers.

When the operator places a stack in the feeder/separator apparatus (module) the bottom envelope of the stack rests in minimum on rollers R3/belts B1, but the leading edge of the bottom sheet is not forward enough to be detected by sensor S5. The sensor S5 (pre-separation sensor) recognizes that the leading edge of the envelope is not up at normal starting position. When the machine recognizes this condition the machine starts rollers R2, R3/B1 and R4 to bring the envelope on the bottom of the stack forward to the pre-separation brake. Once the leading edge of the bottom envelope is sensed by sensor S5, normal feeding can begin. Rollers, R2, R3/belt B1 and R4 are operated to bring the leading edge of the bottom most envelope through the pre-separation brake and the main separation brake and eventually past the intake sensor S3. If the leading edge does not reach the intake sensor S3 within a certain amount of predetermined time the system assumes that there has been a paper jam and shuts down so the operator can correct the problem.

Assuming that the leading edge of the bottom sheet is detected by sensor S3, feeding continues through rollers R3/belt B1 and rollers R4. The leading edge of the bottom sheet is fed onto rollers R5, which are always on when the machine is feeding envelopes, and then past sensor S4, the output sensor.

While the rollers R2, B3/B1 and R4 are set to on simultaneously at feed command they are set to off individually. The timing is such that a roller/belt is not acted any longer when the trailing edge of a transported letter leaves that roller/belt.

For short letters (no long letter sensed by sensor S1) R2 is shut off immediately with letter detection by sensor s3. R3/B1 are shut off when the leading edge passed sensor s3 by (e.g.) 30 mm. The rollers R4 are shut off when the leading edge passed the sensor s4 by (e.g.) 40 mm.

If there is a long letter sensed by sensor s1, R2 remains on until sensor s4 detects the leading edge. Rollers R3/belt B1 remain on until the leading edge passed sensor s4 by (e.g.) 60 mm and rollers R4 remain on until the letter leading edge passed s4 by (e.g.) 160 mm. The numbers in mm mentioned are default values and may be set according actual needs.

After the bottom envelope is fed from the stack, normally the leading edge of the next two or so envelopes in the stack have been brought to the area of the pre-separation brake and are queued up for the next feed. This is the normal run condition after the bottom sheet has been fed. Since the sheet just above the bottom sheet is now detected by the pre-separation sensor S5, after the bottom envelope has been completely removed, the feeder is ready to start the process of separating the next envelope from the stack.

Sometimes the envelopes on top of the envelope just being fed are not brought along to the area of the pre-separation brake. This is a condition very similar to the condition when the stack of envelopes is first placed in the feeder. Although in this case, the bottom envelope has previously been feed. This condition is sensed when the leading edge of the next envelope is not detected by the pre-separation sensor and the stack sensor S2 still sends information that there are envelopes to be fed from the stack. In turn, this tells the machine to go into the mode that it did when the stack was first placed in the feeder, i.e., the bottom envelope is to feed to the pre-separation brake. The process of separation is then begun after the leading edge of the next envelope has been detected by the pre-separation brake.

Figure 4:
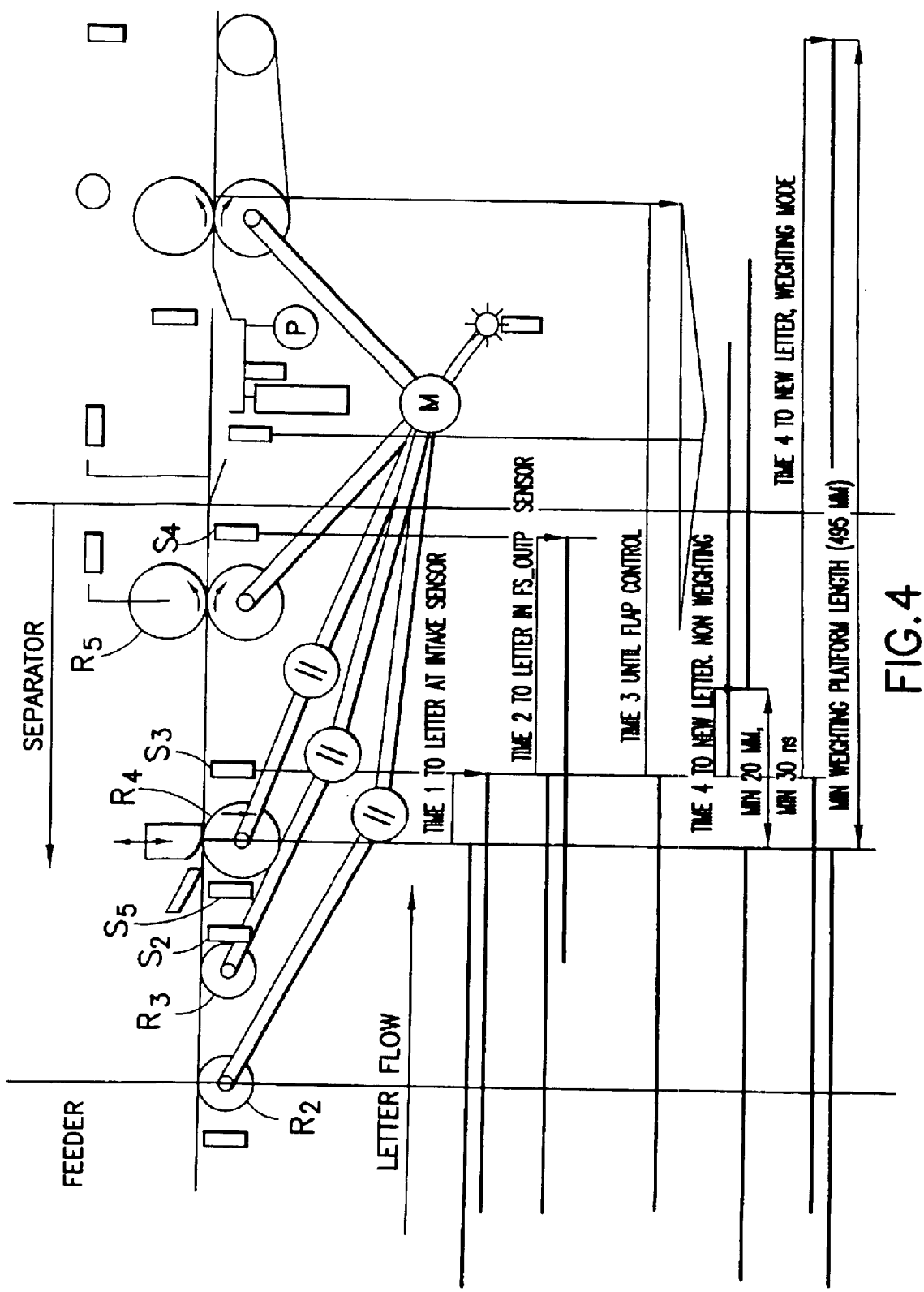
FIG. 4 is a plan diagram illustrating a feeder/separator function and timing diagram.

Five sensors control the stopping of the various sets of rollers and belts. S1—the long letter sensor, S2—the stack dome sensor, S3—the intake sensor, S4—the output sensor and S5—the pre-separation sensor. FIG. 4 illustrates a timing diagram for the feeder/separator in accordance with the present invention. The sensors generally transmit conditions; letter or no letter. The event calculated is usually the arrival of a leading edge of an envelope. The sensors could be mechanical, electrical or optical sensors. All of these sensors would accomplish the desired results.

The five sensors which control separation of an envelope from a stack of envelopes are as follows:

Pre-Separation Sensor (S5)—tells when the next sheet to be separated is properly positioned in the separator Stack Sensor (S2)—determines when there is one or more sheets in the stack to be fed Long Envelope Sensor (S1)—defines a timing behavior different from short letters Intake Sensor (S3)—tells the machine that the leading edge of the sheet just being separated made it through the two brakes within a certain predetermined amount of time and no jam has occurred and that the sheet being separated is about to be picked up by the take away rollers Output Sensor (S4)—determines that the leading edge of the sheet being separated has passed into the take away rollers and that nothing in the separator will stop its successful transport through the rest of the feed path.

Figure 5:
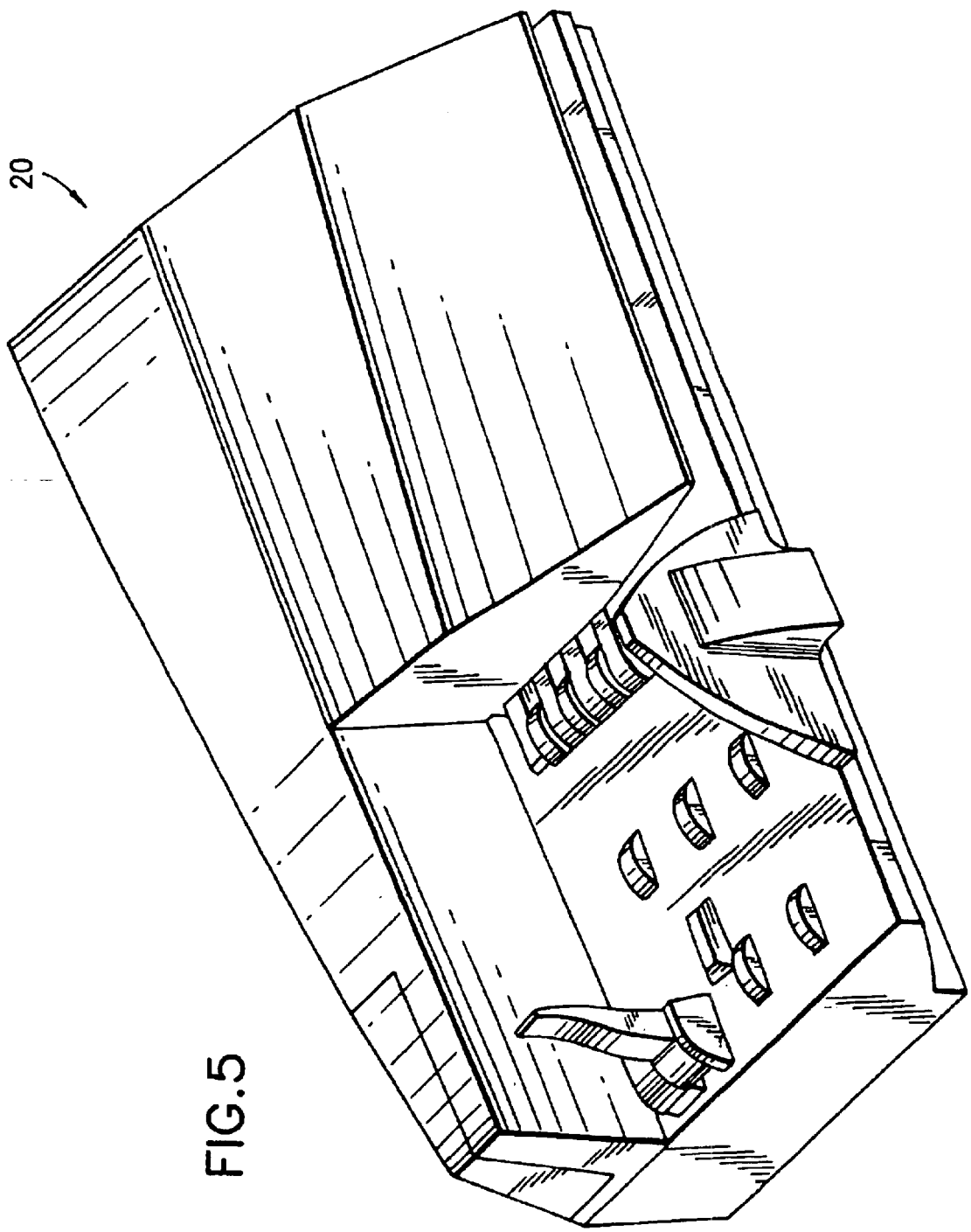
FIG. 5 is a perspective view of a feeder/separator module as employed in a modular mailing machine.

FIG. 5 illustrates a feeder/separator that can include a moistener apparatus all in the form of a feeder module 20 in accordance with the features described herein which could be used in the modular mailing machine as described in Serial No. 10/081,278, filed Feb. 21, 2002, for MODULAR FRANKING SYSTEM by Christian Moy, Daniel Fluckiger and Peter Stutz.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A feeder/separator apparatus for separating and moving sheets from a stack of sheets comprising:

an input area for positioning the stack of sheets;

a first and second series of rollers for jointly feeding a sheet on the bottom of the stack into an area of the apparatus including a third and fourth series of rollers and a first series of belts;

a pre-separation brake adapted to act in a pivoting pattern on the first series of belts only, to thereby cause a first stage separation of the bottom sheet;

a separation brake adapted to act in a linear pattern on the fourth series of rollers only, to thereby cause a second stage separation of the bottom sheet, the pre-separation and separation brakes permitting the bottom sheets to be separated from the stack; and a fifth series of rollers and a second series of belts both being adapted to feed the bottom sheets away from the feeder/separator apparatus in a sheet feed path.

2. A feeder/separator apparatus in accordance with claim 1 wherein said sheets are mailpieces.

3. A feeder/separator apparatus in accordance with claim 1 wherein said sheets are envelopes.

4. A feeder/separator apparatus in accordance with claim 3 wherein said apparatus automatically adjusts to envelope thickness.

5. A feeder/separator apparatus in accordance with claim 3 wherein said envelopes are of mixed thickness and sizes.

6. A feeder/separator apparatus in accordance with claim 3 wherein said envelopes are being fed to a postage meter.

7. A feeder/separator apparatus for separating and moving sheets from a stack of sheets comprising:

an input area for positioning the stack of sheets;

a first and second series of rollers for jointly feeding a sheet on the bottom of the stack into an area of the apparatus including a third and fourth series of rollers and a first series of belts;

a pre-separation brake adapted to act in a pivoting pattern on the first series of belts only, to thereby cause a first stage separation of the bottom sheet;

a separation brake adapted to act in a linear pattern on the fourth series of rollers only, to thereby cause a second stage separation of the bottom sheet, the pre-separation and separation brakes permitting the bottom sheets to be separated from the stack; and a fifth series of rollers and a second series of belts both being adapted to feed the bottom sheets away from the feeder/separator apparatus in a sheet feed path, wherein said feeder/separator apparatus is module for a modular mailing machine.

8. A feeder/separator apparatus in accordance with claim 6 wherein said apparatus includes a moistener positioned within said apparatus for moistening a glue area on a flap of said envelopes.

9. A feeder/separator apparatus for separating and moving sheets from a stack of envelopes, the apparatus being adapted to adjust to envelope thickness comprising:

an input area for positioning the stack of envelopes;

a first and second, series of rollers for jointly feeding an envelope on the bottom of the stack into an area of the apparatus including a third and fourth series of rollers and a first series of belts;

a pre-separation brake adapted to act in a pivoting pattern on the first series of belts only to cause a first stage separation of the bottom envelope;

a separation brake adapted to act in a linear pattern only on the fourth series of rollers to cause a second stage separation of the bottom envelope, the pre-separation and separation brakes permitting the bottom envelopes to be separated from the stack; and a fifth series of rollers and a second series of belts both being adapted to feed the bottom envelopes away from the feeder/separator apparatus in an envelope feed path.

10. A feeder/separator apparatus in accordance with claim 9 further comprising a plurality of sensors adapted to control the starting and stopping of movement of various sets of said rollers and said belts in direct relation to the arrival or non-arrival of a leading edge of an envelope.

11. A feeder/separator apparatus in accordance with claim 9 further comprising a pre-separation sensor adapted to sense the leading edge of an envelope at a starting position in said apparatus.

12. A feeder/separator apparatus in accordance with claim 9 further comprising a sensor adapted to determine when there are envelopes in the stack of envelopes to be fed.

13. A feeder/separator apparatus in accordance with claim 9 further comprising a sensor adapted to sense long envelopes.

14. A feeder/separator apparatus in accordance with claim 9 further comprising a sensor adapted to sense that a leading edge of an envelope being separated traveled through said pre-separation and separation brakes within a predetermined time without a jam and that said envelope being separated is about to be picked up by the fifth series of rollers.

15. A feeder/separator apparatus in accordance with claim 9 further comprising an output sensor adapted to sense that the leading edge of the envelope being separated has passed through said apparatus.

* * * * *